(12) United States Patent
Hudson et al.

(10) Patent No.: US 7,693,402 B2
(45) Date of Patent: Apr. 6, 2010

(54) THERMAL STORAGE UNIT AND METHODS FOR USING THE SAME TO HEAT A FLUID

(75) Inventors: Robert S. Hudson, Austin, TX (US);
David E. Perkins, Austin, TX (US);
Donald M. Hudson, Austin, TX (US);
David J. Beatty, Austin, TX (US);
Donald L. Stamets, Cedar Park, TX (US); Joseph F. Pinkerton, Austin, TX (US)

(73) Assignee: Active Power, Inc., Austin, TX (US)

( * ) Notice: Subject to any disclaimer, the term of this patent is extended or adjusted under 35 U.S.C. 154(b) by 1538 days.

(21) Appl. No.: 10/993,877

(22) Filed: Nov. 19, 2004

(65) Prior Publication Data

US 2006/0107664 A1    May 25, 2006

(51) Int. Cl.
*F24H 7/02* (2006.01)
*F01K 1/00* (2006.01)

(52) U.S. Cl. .................. 392/341; 392/449; 392/450; 392/451; 392/452; 392/453; 392/454; 392/456; 60/657; 60/645; 60/670; 60/652; 60/646; 165/10; 165/236; 165/902; 165/158; 165/DIG. 539

(58) Field of Classification Search .................. 392/341, 392/449–54, 456; 60/659, 657, 645, 670, 60/652, 646; 165/10, 236, 902, DIG. 539, 165/158

See application file for complete search history.

(56) References Cited

U.S. PATENT DOCUMENTS

| 3,262,190 A | 7/1966 | Rostoker et al. |
| 3,381,113 A * | 4/1968 | Jacques et al. ............. 392/346 |
| 3,596,034 A * | 7/1971 | Mekjean ..................... 219/628 |
| 4,483,364 A | 11/1984 | Ayler |
| 4,756,154 A | 7/1988 | Minardi et al. |
| 5,024,058 A | 6/1991 | Shekleton et al. |

(Continued)

FOREIGN PATENT DOCUMENTS

DE    27 20 142    11/1978

(Continued)

OTHER PUBLICATIONS

Schmidt F. W. et al., "Design Optimization of a Single Fluid, Solid Sensible Heat Storage Unit", Journal of Heat Transfer, Transactions of the ASME, May 1977, vol. 99, pp. 174-179.

(Continued)

*Primary Examiner*—Shawntina Fuqua
(74) *Attorney, Agent, or Firm*—Hulsey Intellectual Property Lawyers, P.C.

(57) ABSTRACT

A thermal storage unit having at least one conduit around which a cast is made is provided. The thermal storage unit uses conventional piping or tubing to create conduits that economically maximize the surface area of flow in contact with the thermal mass by proving multiple passes for the fluid through the cast. This enables the thermal storage unit to economically provide heat storage as well as effective heat delivery and pressure containment for a fluid flowing through the conduit.

24 Claims, 10 Drawing Sheets

U.S. PATENT DOCUMENTS 6,493,507 B2    12/2002    Salyer

FOREIGN PATENT DOCUMENTS

JP          56-75911        6/1981
JP          3-95334         4/1991

OTHER PUBLICATIONS

Krane R. J., "A Second Law Analysis of a Thermal Energy Storage System With Joulean Heating of the Storage Element", Annual Meeting of the American Society of Mechanical Engineers, ASME Paper 85 WA/HT-19, Nov. 1985.
Geyer M. et al., "Evaluation of the Dual Medium Storage Tank at the IEA/SSPS Project in Almeria (Spain)", 8412-0986-3/86/0869-181 American Chemical Society, 1986, pp. 820-827.
Tamme R. et al., "High Temperature Thermal Storage Using Salt/Ceramic Phase Change Materials", 8412-0986-3/86/0869-187 American Chemical Society, 1986, pp. 846-849.
Tracey T. R. et al., "Economical High Temperature Sensible Heat Storage Using Molten Nitrate Salt", 8412-0986-3/86/0869-188 American Chemical Society, 1986, pp. 850-855.
Krane R. J., "A Second Law Analysis of the Optimum Design and Operation of Thermal Energy Storage Systems", International Journal of Heat and Mass Transfer, 1987, vol. 30, No. 1, pp. 43-57.
Geyer M. A., "Thermal Storage for Solar Power Plants", Solar Power Plants Fundamentals, Technology, Systems, Economics, 1991, chapter 6, pp. 199-214.
Taylor M. J. et al., "Second Law Optimizing of a Sensible Heat Thermal Energy Storage System With a Distributed Storage Element—Part I: Development of the Analytical Model", Journal of Energy Resources Technology, Transactions of the ASME, Mar. 1991, vol. 113, pp. 20-26.
Jotshi C.K. et al., "Heat Transfer Characteristics of a High Temperature Sensible Heat Storage Water Heater Using Cast Iron as a Storage Material", Proceedings of the 31st Intersociety Energy Conversion Engineering Conference, 1996, vol. 3, pp. 2099-2103.
"Survey of Thermal Storage for Parabolic Trough Power Plants", National Renewable Energy Laboratory, NREL/SR-550-27925, Sep. 2000.
Jotshi C.K. et al., "A Water Heater Using Very High-Temperature Storage and Variable Thermal Contact Resistance", International Journal of Energy Research, Jun. 4, 2001, pp. 891-898.

* cited by examiner

THERMAL STORAGE UNIT AND METHODS FOR USING THE SAME TO HEAT A FLUID

BACKGROUND OF THE INVENTION

This invention relates to thermal storage units (TSUs). More particularly, this invention relates to TSUs that provide sensible heat thermal energy storage and delivery in a way that increases efficiency and reduces costs compared to known TSUs.

TSUs are well known and are often used in power delivery systems, such as compressed air storage (CAS) systems and thermal and compressed air storage (TACAS) systems. Such systems, often used to provide an available source of electrical power, often use compressed air to drive a turbine which powers an electrical generator.

In TACAS systems, it is desirable to heat the compressed air prior to reaching the inlet port of the turbine. It is known that heated air, as opposed to ambient or cool air, enables the turbine to operate more efficiently. Therefore, a mechanism or system is needed to heat the air before providing it to the turbine. One approach is to use a suitable type of fuel-combustion system. Another approach is to use a TSU. While fuel-combustion systems usually emit polluting gases, TSUs may be preferable over fuel-combustion systems at least because they are not associated with such harmful emissions.

Although TSUs may offer advantages over fuel-combustion systems, existing TSUs have several shortcomings, as discussed below. Moreover, TSUs are typically designed to take many of the following design considerations into account:

(1) the physical dimension of the TSU;
(2) the TSU's capacity to heat fluid to a predetermined temperature;
(3) the thermal energy storage capacity of the TSU;
(4) the mass flow rate of fluid flowing through the TSU;
(5) the ability to minimize the pressure drop of fluid as it flows through the TSU;
(6) the ability to heat the fluid using forced convection heating;
(7) providing reliable and safe operation in high pressure applications; and
(8) low manufacturing costs.

Figure 1:
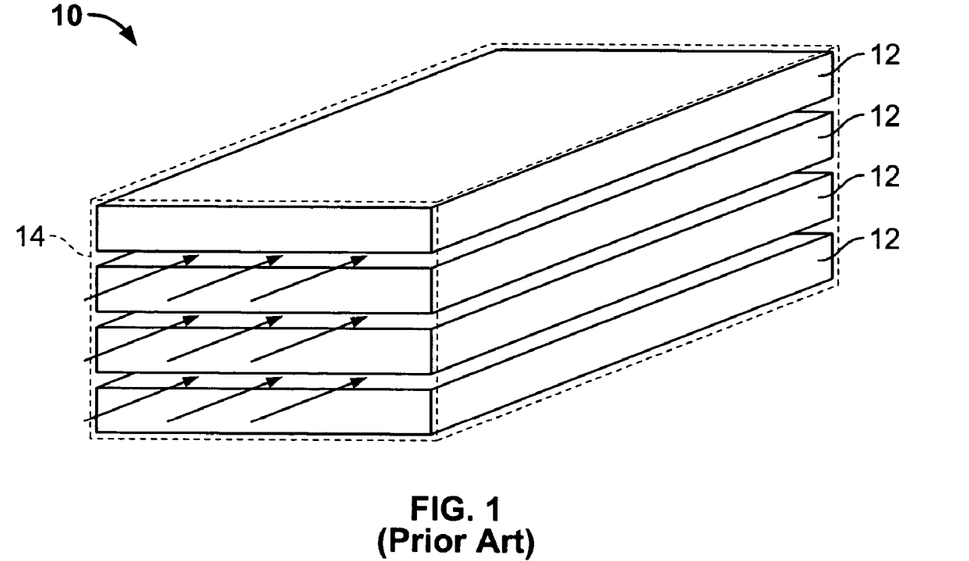
FIG. 1 is a top perspective view of a known thermal storage unit.
Figure 2:
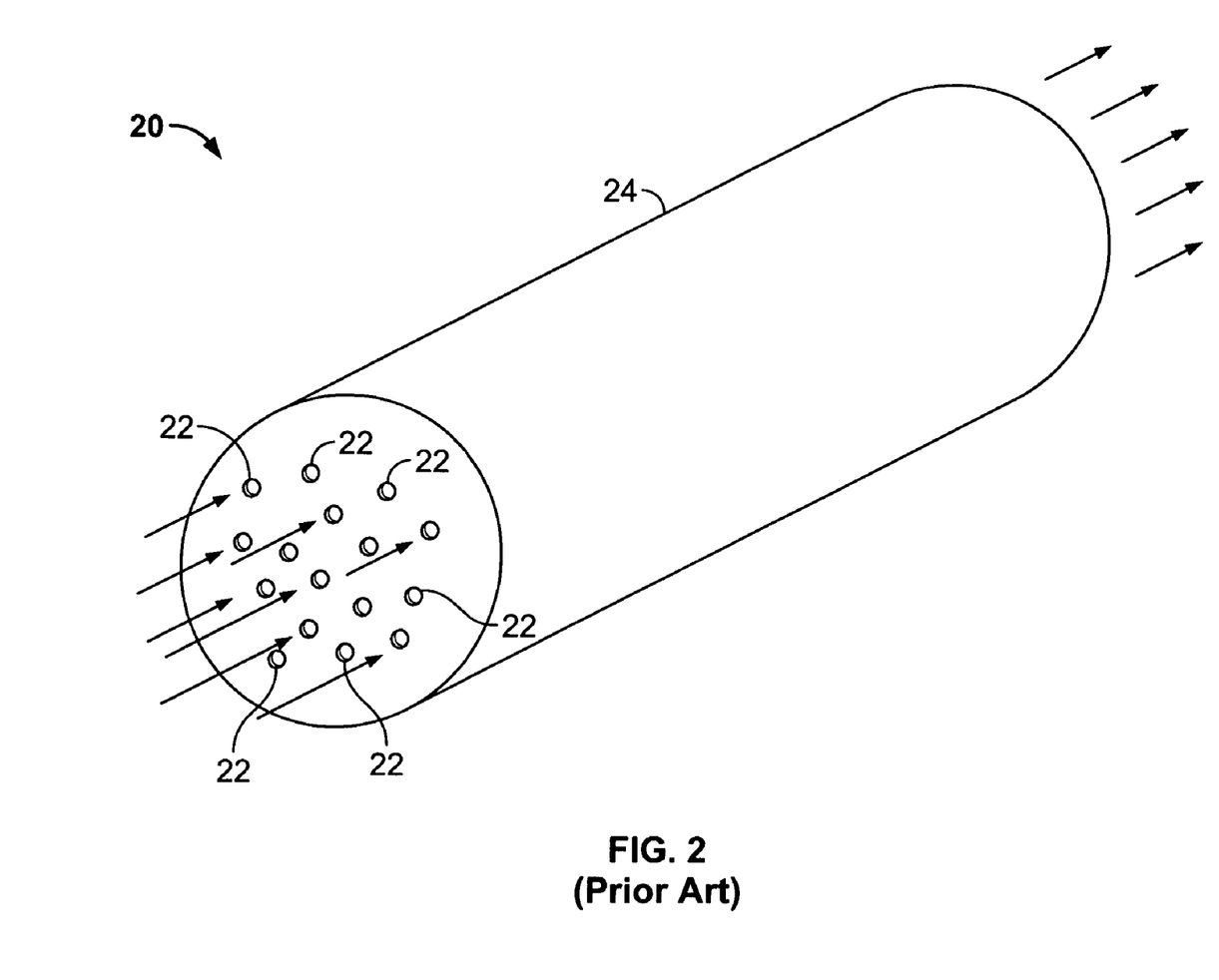
FIG. 2 is a top perspective view of another known thermal storage unit.

Conventional TSUs, such as those shown in FIGS. 1 and 2, may not be able to accommodate many or all of the forgoing criteria.

TSU 10 of FIG. 1 includes heated parallel plates 12 contained within housing 14 to create channels through which compressed gas may flow. The heat transfer area and the gap between plates 12 may be adjusted for optimum heat transfer conditions. Such a TSU, however, is not optimally suited for high pressure operation as these plates do not provide optimum pressure containment for the compressed gas, and instead result in leakage flow between plates 12 and housing 14.

Another known TSU uses tube flow through elongated cavities embedded in a solid medium. As shown in FIG. 2, compressed gas travels through through-holes 22, which are bored out of bar 24. Although tube flow, as provided by TSU 20 of FIG. 2, may provide more desirable pressure containment compared to channel flow TSU 10 of FIG. 1, it involves high fabrication costs. This is because it is usually costly to drill a plurality of small-diameter holes that extend throughout the entire length of a solid medium.

Therefore, it can be seen that the TSUs shown in FIGS. 1 and 2 fail to provide means for effectively containing and delivering heated and compressed air in a manner that is cost beneficial. In addition, it can be seen that the foregoing TSUs are limited in design flexibility at least because they either require machining or assembly of several parts to provide fluid conducting passageways.

In view of the foregoing, it is an object of this invention to provide a low-cost TSU that provides efficient heat storage, heat delivery and pressure containment.

It is also an object of the invention to provide enhanced design flexibility to better adhere to predetermined design criteria.

SUMMARY OF THE INVENTION

These and other objects of the present invention are accomplished in accordance with the principles of the present invention by providing a TSU that is constructed using a casting process. A TSU according to the present invention may be constructed by first providing a conduit (or fluid conducting structure) and then subjecting that conduit to a casting process. The conduit may provide a pathway through which fluid flows through the TSU and the casting process may yield a cast that envelops the conduit with thermal storage material. The cast may have desirable thermal mass or thermal storage properties and may be fabricated from inexpensive material, such as ductile iron. The cast may permeate and occupy substantially all free space existing immediately adjacent to and near the conduit, resulting in a cohesive and integrated TSU in which the conduit and the cast may be fused together. Thus, after the cast sets, a solid thermal conducting mass having a fluid conducting passageway, as defined by the conduit, is provided.

An advantage of constructing a TSU using a casting process is that it provides substantial design flexibility, while reducing manufacturing cost. Design flexibility may be realized because the design and selection of the material composition of the conduit may be exercised independent of the design and selection of the material composition of the cast. This may enable TSUs according to the invention to have mass flow and thermal transfer properties and pressure containment not previously attainable in prior art TSUs. For example, the TSU may include a conduit that is a parallelepiped structure (e.g., a structure in which the fluid path passes back and forth along a particular axis a predetermined number of times), which is contained within a cast. It may not be possible to construct such a TSU using conventional machining techniques, and even if it were possible, the cost would be prohibitively expensive.

Moreover, the cast may permeate and occupy the free space existing between the parallelepiped structure, thereby maximizing the heat storage capacity and heat transfer capacity of the TSU. In addition to providing energy storage and efficient heat transfer, the cast may provide structural support for the TSU, thereby enabling it to contain pressurized fluids.

The TSU may be heated to a predetermined temperature or a predetermined range of temperatures. This may be accomplished using a heating system that uses internal or external heaters to heat the cast. In one embodiment, internal heaters such as cartridge heaters may be housed in holes bored into the cast of the TSU. When active, the internal heaters radiate heat to the cast, thereby raising the temperature of the TSU to a desired temperature.

The TSU according to the invention may be used in a TACAS system. In a TACAS system, compressed gas may be sensibly heated by the TSU before it is routed to a turbine inlet of a turbine-generator. The heated compressed air drives a turbine, which powers an electrical generator to provide electrical power. An advantage of using the TSU according to the invention is that it may heat the compressed gas without requiring the use fuels, which when combusted cause pollution.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Figure 3A:
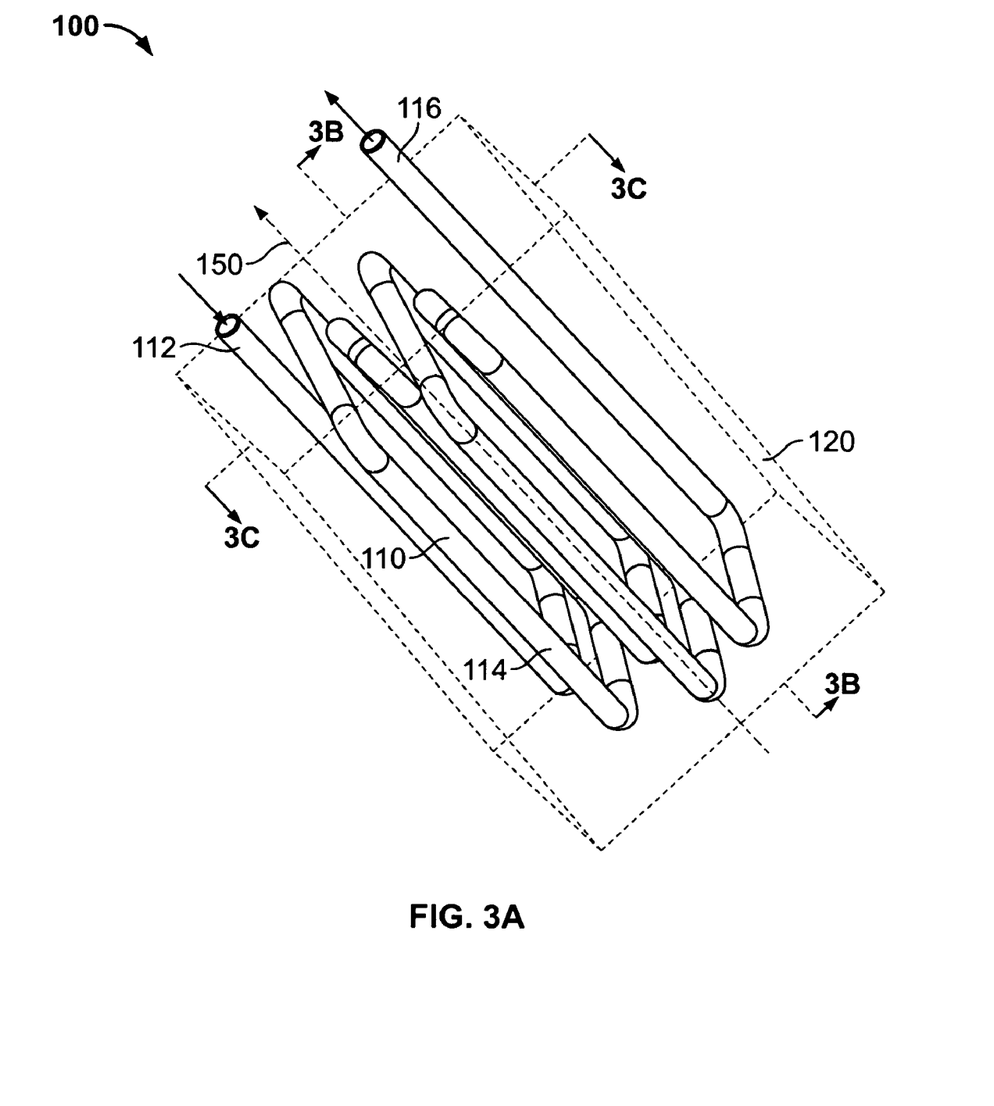
FIGS. 3A-C show perspective and cross-sectional views of an illustrative thermal storage unit in accordance with the principles of the present invention.
Figure 3B:
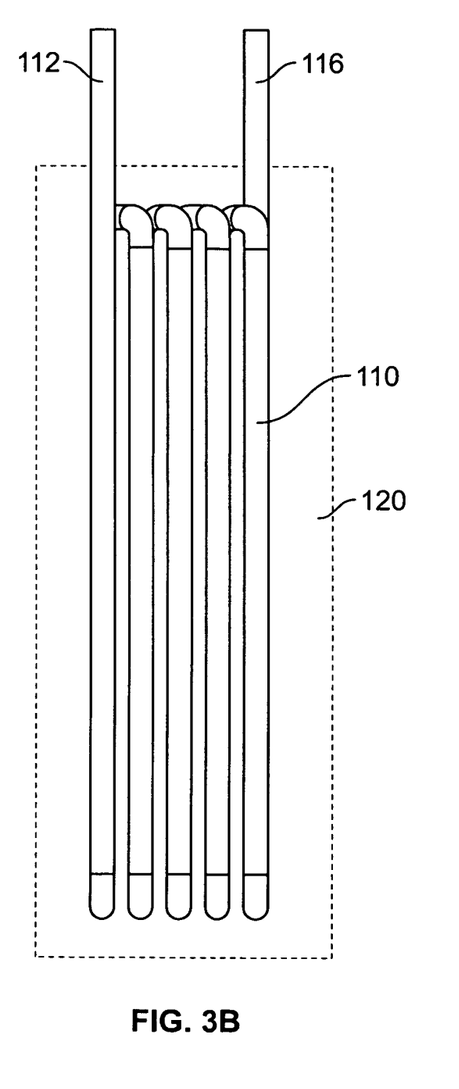
Figure 3C:
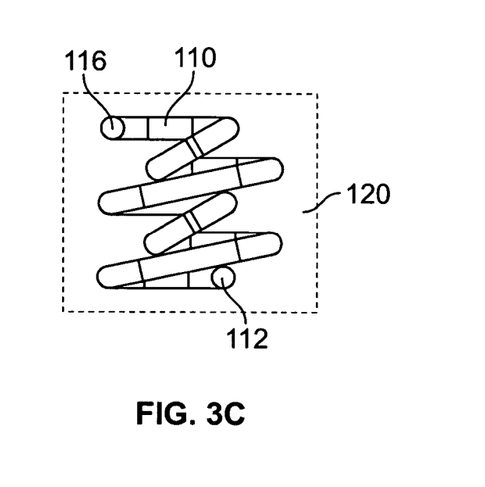

FIGS. 3A-C shows several views of a thermal storage unit (TSU) 100 that is in accordance with the principles of the present invention. In particular, FIG. 3A shows a three-dimensional view of thermal storage unit (TSU) 100 that is in accordance with the principles of the present invention. FIG. 3B shows a cross-sectional view of TSU 100 taken along the lines 3B-3B of FIG. 3A in accordance with the principles of the present invention. FIG. 3C shows a cross-sectional view of TSU 100 taken along the lines 3C-3C of FIG. 3A. It will be understood that any reference to FIG. 3 may include a reference to any one of FIGS. 3A-C.

TSU 100 may include conduit 110 and cast 120 and have longitudinal axis 150. As shown in FIG. 3, a significant portion of conduit 110 (e.g., conduit body 114) is enclosed by a dashed-line box, whereas inlet 112 and outlet 116 may remain unenclosed by the box. This box represents a cast 120 that envelops conduit 110 according to the invention. The manner or nature in which cast 120 envelops conduit 110 may depend on the casting method or technique used to create cast 120. For example, the casting process may result in a bond between the outer walls of conduit body 114 and the casting material (e.g., iron, steel, or alloys thereof) without resulting in excessive loss of conduit wall thickness due to melting. In such a casting process, the casting material may permeate and occupy substantially all free space existing immediately adjacent to and near conduit body 114, resulting in a cohesive and integrated TSU in which conduit body 114 and the casting material are fused together. Thus, after the casting material sets, TSU 100 is a solid thermal conducting mass having a fluid conducting passageway, as defined by conduit 110, contained therein.

As shown in FIG. 3, TSU 100 includes inlet 112, for permitting a fluid to flow into conduit 110, and outlet 116, for permitting the fluid to flow out of conduit 110. Fluid may be matter in a liquid or gas state, matter transitioning between a liquid and gas state, or a combination thereof. In some embodiments, the fluid may be air, argon, or any other suitable gas. Other fluids may be used that change phase (e.g., change from a solid to a liquid) as the temperature of the fluid changes.

TSU 100 may be used to heat or cool the fluid flowing through conduit 110, depending on the application in which TSU 100 is being used. For purposes of clarity and simplicity, it will be assumed that TSU 100 is used to heat fluid. In TACAS applications, for example, TSU 100 may heat the fluid to a predetermined range of temperatures for driving a turbine-generator. (A more detailed discussion of the operation of a turbine-generator in connection with TACAS system is discussed below in the text accompanying FIG. 9). It is noted that turbine-generators generally operate more efficiently when the fluid being supplied to the turbine inlet ranges between a predetermined temperature and pressure. Therefore, it is understood that a thermal storage unit, such as TSU 100, may be needed to heat the fluid to a predetermined temperature without substantially affecting the pressure of the fluid passing through the TSU.

TSU 100 addresses these temperature and pressure requirements, as well as other criteria such as physical dimensions of the TSU, the mass flow rate of fluid through the TSU, and reliable and safe operation in high pressure applications, by constructing the TSU with conduit 110 and cast 120 according to the invention. This conduit 110 and cast 120 construction provides enhanced design flexibility at relatively low manufacturing costs not previously attained by the prior art. Low manufacturing costs may be achieved because conventional products and materials may be used to construct conduit 110 and cast 120. Moreover, the conduit and cast construction eliminates the need to perform time consuming and expensive drilling (e.g., high precision and/or tolerance drilling) to provide one or more fluid conducting passageways.

Design flexibility may be achieved because conduit 110 may be designed independent of cast 120. For example, conduit 110 may be a parallelepiped structure such as that shown in FIG. 3 or it may be a helical or coil shaped structure, a tubing coil, a piping coil, pipe network, or other suitable fluid conducting structure. A parallelepiped structure may be a conduit that routes fluid back and forth multiple times on axes substantially parallel to axis 150. An advantage of passing fluid back and forth multiple times is that the fluid has multiple chances to draw heat from cast 120, resulting in a heat transfer system that may heat fluid more effectively than a system that uses a single pass through an identical cast.

Conduit 110 may be a single piece or multiple piece construction. As a single piece construction, conduit 110 may be seamless in construction. For example, it may be a long pipe (e.g., a forty foot pipe having a predetermined inner diameter) that is bent into a predetermined shape (e.g., a parallelepiped shape). A multiple piece construction may be an assembly of components connected to create a continuous flow path. For example, such construction may includes a series of pipes or other flow conducting members connected together in a predetermined configuration.

Conduit 110 may be constructed from materials that have suitable thermal conductivity and that are capable of containing pressure and withstanding temperature variations. For example, one suitable material may be a stainless steel such as 304 steel. Alternatively, to minimize costs by using standard available piping, while ensuring that the predetermined pressure and temperature requirements are met, conventional steel, iron, aluminum, or copper piping may be used. In addition, conduit 110 may be constructed from materials that have a high resistance to oxidation.

Moreover, the positioning of inlet 112 and outlet 116 may be a matter a design choice. For example, both inlet 112 and outlet 116 may be positioned on the same end of the TSU or on opposite ends. Moreover, the inlet and outlet need not protrude from cast 120 parallel with axis 150. If desired, inlet and outlet may protrude from cast 120 perpendicular to axis 150.

Design flexibility is further achieved because cast 120, when in its amorphous or molten state, envelops and bonds to conduit 110, regardless of the shape of conduit 110. Furthermore, the "external" shape of cast 120 may be set to have pre-determined dimensions (e.g., a rectangular or circular shape of desired dimensions) while the cast is in its amorphous or molten state. This flexibility in shaping the casting material provides for a TSU that may be custom fit into an integrated package such as a TACAS backup power supply system. If desired, cast 120 may be shaped to minimize the external surface area, thereby maximizing the heating capacity and potential for retaining heat within the thermal storage material. Insulation may be used to further enhance the heating capacity and potential to retain heat.

In one embodiment, cast 120 may be made to have a rectangular shape (e.g., 10"×10"×30" rectangular box), which may be easily manufactured and packaged. The rectangular shape may be an ideal cast for a parallelepiped conduit structure such as that shown in FIG. 3.

Cast 120 may be obtained through one or multiple casting stages. In a single stage casting process, the casting material may be applied to conduit body 114 in one step to create the TSU according to the invention. If a multiple stage casting process is performed, the casting material may be applied to conduit body 114 in several steps using, for example, different materials in each step. For example, certain materials may be applied to ensure a bond between adjacent layers of the cast material and to minimize porosity or sponginess in the cast.

Cast 120 may include one or more types of materials that exhibit desirable thermal mass and or thermal storage properties. Such materials may include, for example, iron, steel, stainless steel, aluminum, other metals, or alloys and composites thereof. If desired, such materials may be ductile to permit ease of drilling, for example, of holes in which eating elements may be inserted. Other more advanced casting materials may be used to further enhance the thermal energy storage capacity. One such material is high silicon molybdenum ductile iron, which is alloyed with silicon and molybdenum to allow the material to be used at a higher temperature, enhancing energy storage performance.

During the casting process, it may be desirable to cast the material so that it is uniformly distributed about conduit 110. For example, conduit 110 may be positioned concentrically within cast 120, irrespective of the cast's shape, to provide a relatively equal distribution of thermal storage material on each side of conduit 110. Such a distribution may promote more uniform and complete extraction of energy from cast 120.

By using a casting process, TSU 100 may be designed to have specific mass flow and heat transfer characteristics. Optimizing such characteristics may be useful, for example, in a system (e.g., a TACAS system) that utilizes heated compressed gas to drive a turbine-generator. The mass flow rate of fluid flowing through TSU 100 may be a function of one or more of the following criteria: the pressure of the fluid applied to inlet 112 of TSU 100, the shape of conduit 110, the cross-sectional area of conduit 110, and the length of conduit 110. It is appreciated that many of these criteria (e.g., shape, cross-sectional area, and length of conduit 110) can be accounted for based on the design of conduit 110. As such, TSU 100 may exhibit desired mass flow properties such as a predetermined pressure drop across the TSU.

The heat transfer rate may be a function of one or more of the following criteria: the temperature of conduit 110 and cast 120, the convection coefficient, which may depend on the mass flow rate (described above), the surface area of conduit 110 exposed to cast 120, and the surface area of fluid exposed to the inner walls of conduit 110. It will be appreciated that many or all of these criteria can be accounted for when designing and manufacturing TSU 100 in accordance with the principles of the present invention. That is, the design flexibility of both conduit 110 and cast 120 enables a TSU to be constructed that rapidly heats (or cools) a fluid to a predetermined temperature.

TSU 100 may be heated to and maintained at a predetermined temperature using a heating system (examples of which are discussed below) so that heat stored in the thermal storage material (e.g., cast 120) of TSU 100 can be transferred to a fluid flowing through TSU 100. In some embodiments, TSU 100 may be heated and maintained at a predetermined temperature while utility power is available and TSU 100 may transfer heat to a fluid when utility power is not available. An example of such an embodiment is described in more detail below in connection with FIG. 9. It is noted that because thermal storage material permeates TSU 100, as a result of the casting process, heat may be conducted relatively easily throughout TSU 100, regardless of which heating technique is used.

TSU 100 may be heated using one or more of many different heating techniques. Some of these techniques preferably may use exhaustless or non-polluting methods to heat TSU 100. Though exhaustless or non-polluting methods are preferred, it will be appreciated that pollution causing heating techniques (e.g., techniques that use fuel) may be implemented to heat TSU 100. Regardless of the technique used, cast 120 may be heated by radiation means of an external or internal heater. For example, an external heater may include a ceramic fiber heater that is attached to the outer surface of TSU 100 heats cast 120 through radiation when actuated. An internal heater may, for example, include heating elements (e.g., heating rods or cartridge heaters) that are placed into one or more cavities extending through a portion or the entire length of TSU 100. When such heating elements are actuated, they transfer heat to the thermal storage material (e.g., cast 120 and conduit 110) of TSU 100. A more detailed discussion of such an internal heating system (e.g., cartridge heating system) is discussed, for example, in co-pending U.S. patent application Ser. No. 10/943,636, filed Sep. 17, 2004 (hereinafter "the '636 application"), which is incorporated by reference in its entirety.

Figure 4:
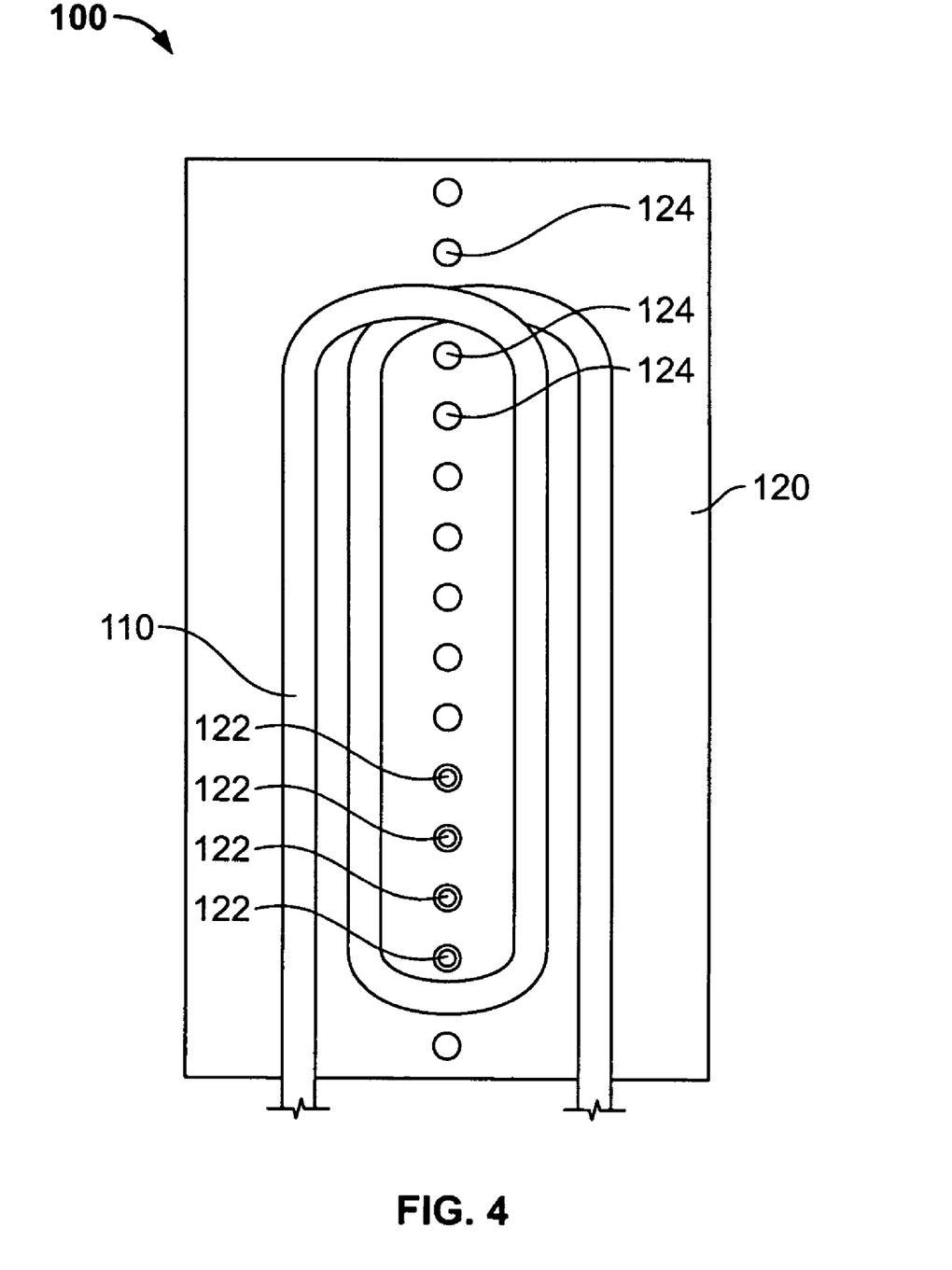
FIG. 4 shows a TSU having internal heating elements contained within cavities of the TSU in accordance with the principles of the present invention.
Figure 5:
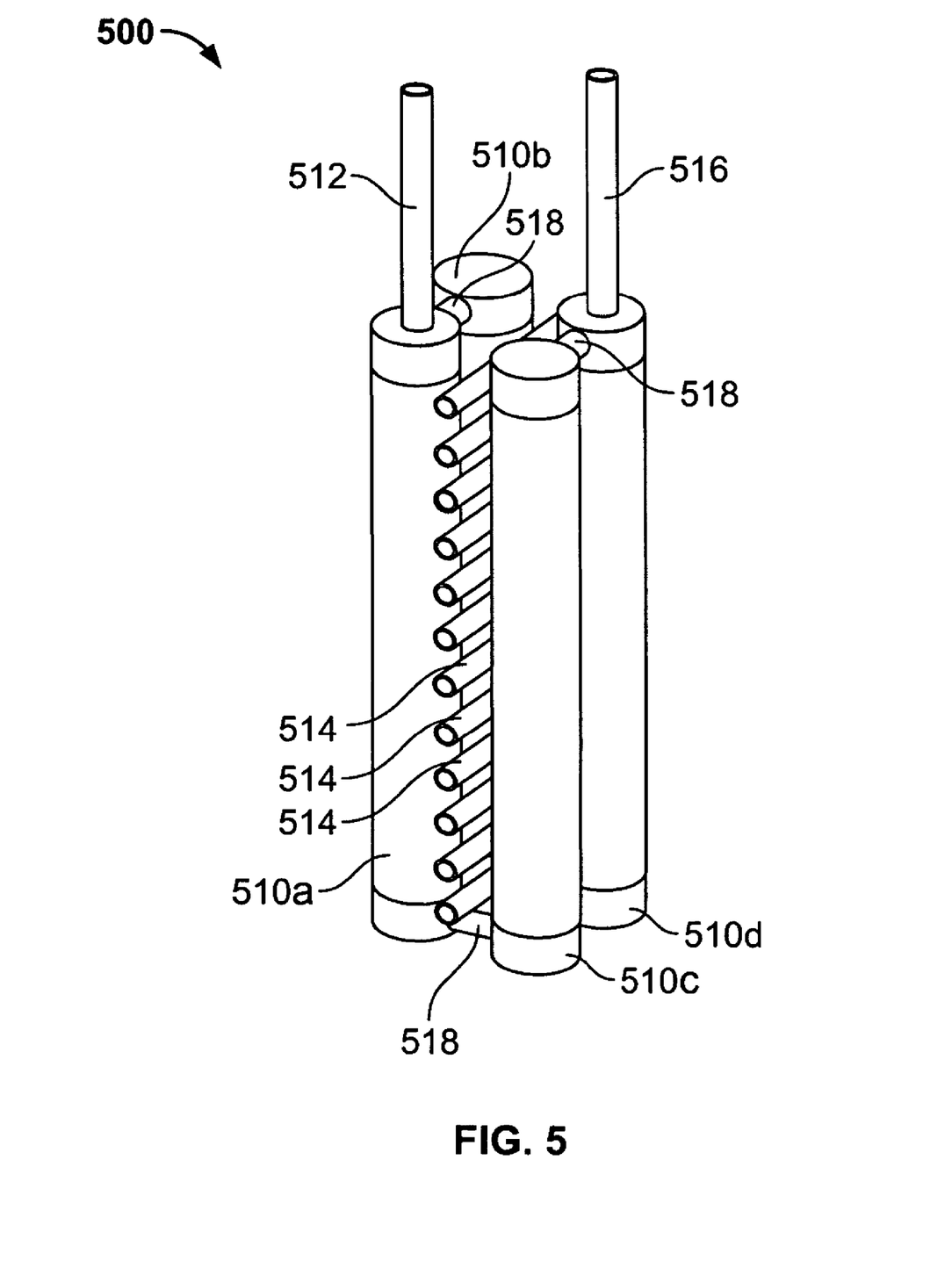
FIG. 5 is a perspective view of a conduit network thermal storage unit that may be subjected to a casting process in accordance with the principles of the present invention.
Figure 6:
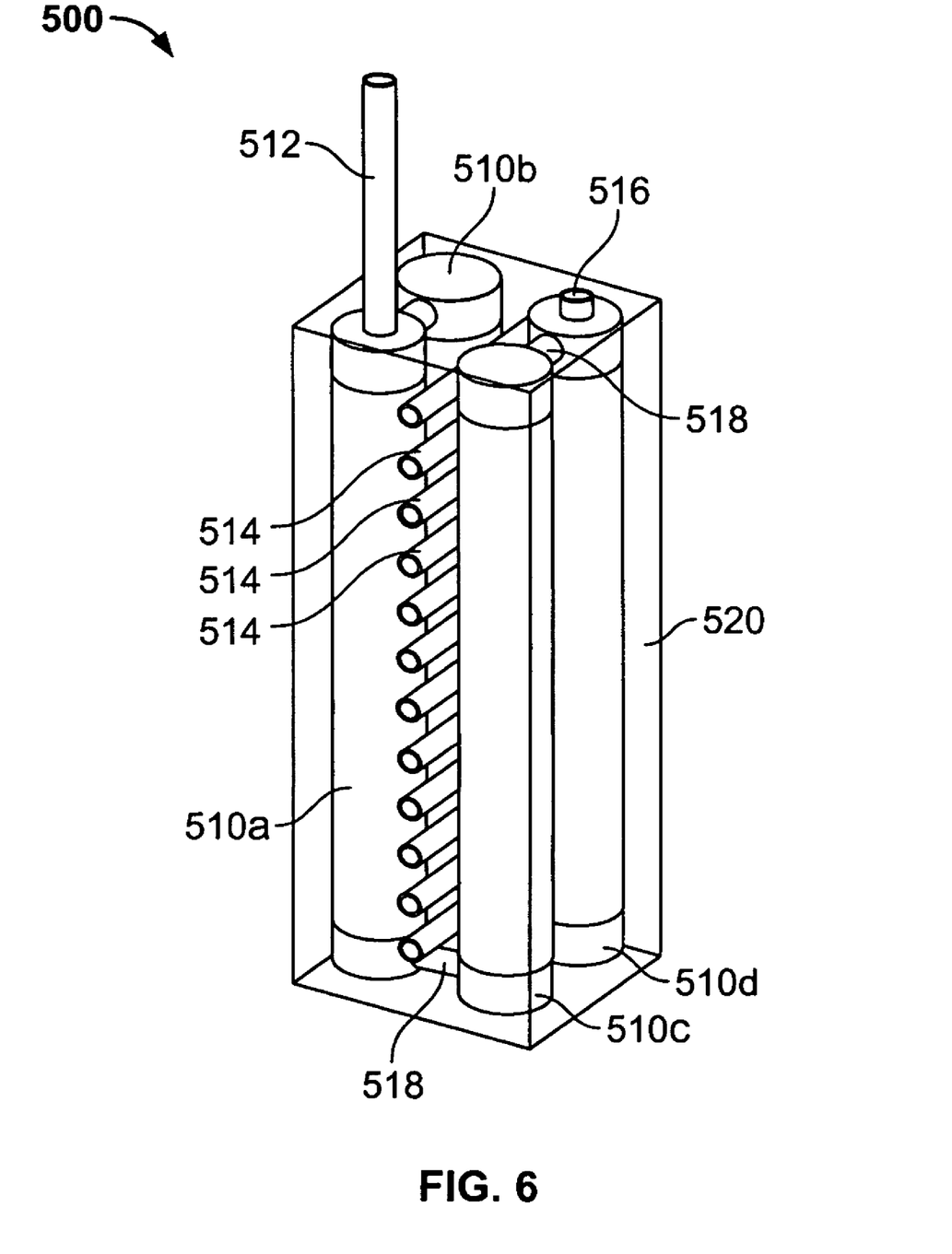
FIG. 6 is a perspective view of the TSU of FIG. 5 having a cast in accordance with the principles of the present invention.

FIG. 4 shows a cross-sectional view of a TSU employing an internal heating system in accordance with the principles of the present invention. The heating system includes a plurality of heating elements 122 that are removably inserted into holes 124 of TSU 100. The heating elements may be electrical resistance heating elements such as cartridge heaters such as those described in the '636 application. Holes 124 may be provided by drilling into cast 120 after the cast sets or cools. The number of and placement of such holes is a matter a design choice, but the holes are preferably drilled such that conduit 110 is not punctured, thereby ensuring that pressure containment is maintained when fluid flows through TSU 100. Moreover, such holes need not be drilled with extremely tight tolerances or dimensions and therefore may not require expensive and time-consuming drilling techniques. Alternative to drilling, holes 124 may be obtained by subjecting hollow tubes (as shown in FIGS. 5 and 6) to the casting process.

It will also be understood by persons skilled in the art that, alternatively, the thermal storage material of TSU 100 may be heated by any other suitable type of heating system. For example, a resistive heater may provide a heat source that is in physical contact with the thermal storage material of TSU 100 and may heat this material to a predetermined temperature. Alternatively, electrically conductive thermal storage materials, such as iron, may be heated inductively using induction heating circuitry that causes current to circulate through and heat the thermal storage material of TSU 100. Thus, the invention is not limited to the specific heating techniques discussed above.

Insulation (not shown) may be used to improve the heat capacity of TSU 100. That is, the insulation may permit TSU 100 to be heated to temperatures not possible in the absence of insulation because of heat losses. In addition, insulation may permit TSU 100 to maintain a predetermined temperature, while requiring less power to maintain such a temperature. The insulation may blanket all or a portion of TSU 100 and may be shaped to conform to the outer surface of TSU 100. The insulation may include any material that provides heat retention. For example, the insulation may include ceramic insulation or microporous board insulation.

The foregoing discussion of TSU 100 described the use of one conduit that is subjected to a casting process to produce a TSU according to the present invention. In another embodiment, a TSU may be constructed to have multiple conduits contained within a cast according to the present invention. In this particular embodiment, two or more conduits of a desired size and shape are subjected to a casting process to provide the TSU.

In yet another embodiment, a conduit network (or pipe network), such as a single annular channel or multiple annular channel TSU, may be subjected to a casting process. An annular channel may be contained between an inner member and an outer member, both of which may include thermal mass or thermal storage material having desirable energy or heat storage properties and may be fabricated using standard mill products. The annular channel may be coupled to a port or pipe on each end of the channel for either providing fluid thereto or projecting fluid therefrom. In a multiple annular channel embodiment, the TSU may include multiple substantially parallel annular flow channels, each being contained between the outer member and a different inner member. If desired, the multiple substantially parallel annular flow channels may be coupled to each other via transverse channels such that various fluid routing arrangements and piping connections are made possible within the TSU.

FIG. 5 shows a perspective view of conduit network (e.g., multiple annular channel) 500 that may be subjected to a casting process in accordance with the principles of the present invention. As shown, network 500 includes four annular channels 510*a-d*. Though not shown, each channel 510*a-d* may include an annular channel. Channels 510*a-d* may be interconnected via transverse members 518, which provides flexibility in routing fluid through TSU 500. Depending on the configuration of transverse members 518, a four-pass/one-path or a two-pass/two-path arrangement may be provided. The two-pass/two-path arrangement is shown in FIG. 5. In this arrangement, fluid may be supplied to inlet 512 and may then flow along two different paths: 1) through channel 510*a* then channel 510*c*, and 2) through channel 510*b* then channel 510*d*, before exiting through outlet 516.

Also shown in FIG. 5 are tubes 514, which are disposed between channels 510*a-d*. Tubes 514 may be used to hold heating elements such as cartridge heaters, as discussed above. Thus, when network 500 is contained within a cast, the holes provided by tubes 514 may eliminate the need to drill holes into the cast to provide receptacles for heating elements. Those of skill in the art will appreciate, however, that holes may be drilled into the cast, in addition to the holes provided by tubes 514.

The foregoing discussion concerning the conduit network, especially with regards to the single and multiple annular channel, is not meant to be an exhaustive discussion, but merely an illustrative discussion of possible pipe networks that can be subject to a casting process to enhance the thermal storage capacity of the conduit network. A more detailed discussion of, for example, single and multiple annular channel TSUs can be found in U.S. patent application Ser. No. 10/943,293, filed Sep. 17, 2004, which is hereby incorporated by reference in its entirety.

FIG. 6 shows the pipe network of FIG. 5 contained within a cast in accordance with the principles of the present invention. Cast 520 may be cast such that it encapsulates and permeates all space existing between channels 510*a-d*, tubes 514, and transverse members 518, but does not cover the openings of inlet 512, tubes 514, or outlet 516. It is noted that with cast 520 disposed about network 500, the thermal storage capacity and the structural support of channels 510*a-d* is increased. It is further noted that heat retention and heating capacity can be further increased using insulation, as discussed above.

An advantage of the TSU of the present invention is that the TSU may have a reduced susceptibility to oxidation, also known as "fouling." In particular, even though the cast material may be ductile iron, which may be susceptible to oxidation if left untreated, fluids passing through the TSU may not come into contact with the cast because the conduit provides sufficient pressure containment. However, as an added precaution, the cast and/or conduit may be coated with a corrosion resistant layer.

Even if the tubing coil is subject to oxidation, the effect of oxidation may be minimal, especially when compared to prior systems such as TSU 20 (FIG. 2). TSU 20 includes long, small diameter through holes 22 which conduct flow of fluid. A small amount of oxidation in through holes 22 may reduce the surface area of the through hole by a significant percentage and lower the heat transfer rate of TSU 20. In contrast, because the TSU according to the present invention can be constructed to have fluid conduits that are substantially larger (e.g., have greater cross-sectional areas) than that of the prior art, a small amount of oxidation may have minimal or negligible affect on the surface area and the heat transfer rate.

Another advantage of the present invention over the systems known in the art is that manufacturers may select two different materials for the two different components of the TSU: a casting material that has good high temperature properties and a low cost to cast, and a conduit material that has good high temperature and high pressure properties and is oxidation resistant. Manufacturers and designers may no longer be required to select a single material that is both oxidation resistant and has both high temperature and high pressure properties at potentially high cost.

Yet another advantage of the invention is two "levels" of pressure containment are provided. The first being provided by the conduit and the second being provided by the cast, which surrounds the conduit. Thus, if pressure containment of the conduit fails, the cast may function as a backup source of pressure containment.

Figure 7A:
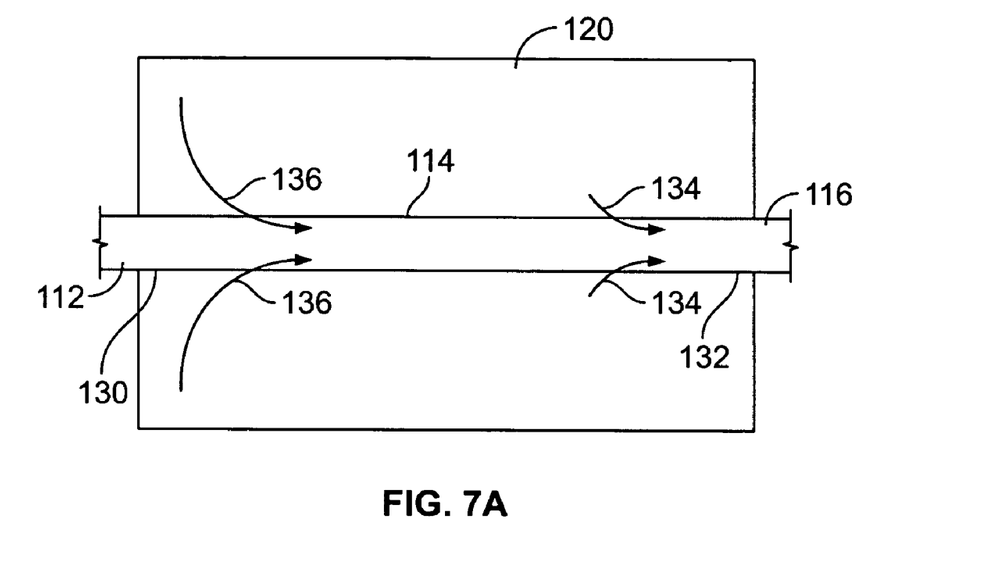
FIGS. 7A-B show heat transfer diagrams of a portion of the TSU of FIG. 3 during different time frames of a heat transfer event in accordance with the principles of the present invention.
Figure 7B:
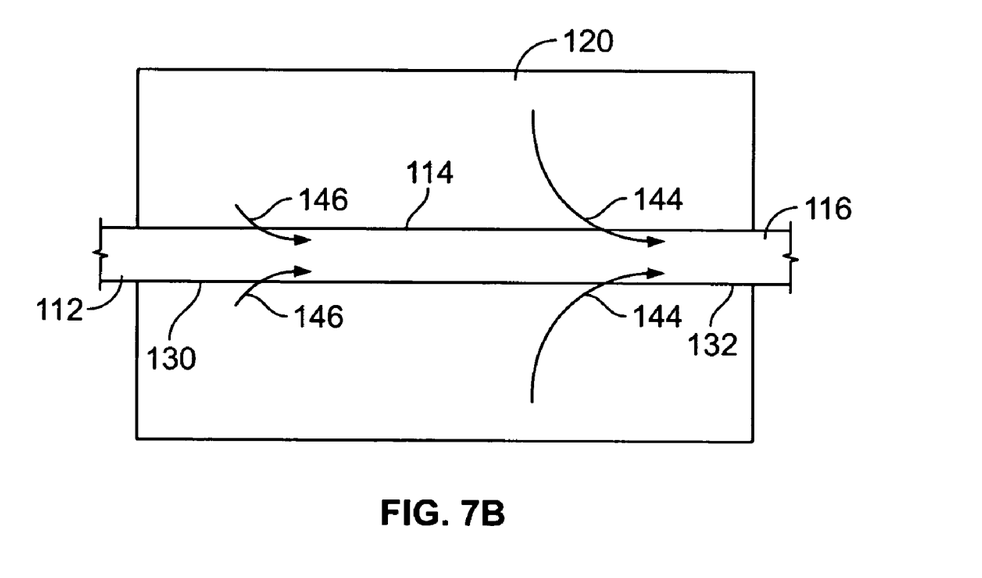

FIGS. 7A and 7B show partial sectional views of TSU 100 of FIG. 3 to illustrate heat transfer to fluid flowing through the TSU at different times during a heat transfer event. Because of the non-linear heat distribution through the cast when the TSU is active, the average temperature of cast 120 may be less than the desired turbine inlet temperature, but the cast may still retain enough heat to raise the temperature of the fluid to the desired inlet temperature. When fluid starts to flow through TSU 100, heat is first removed from proximal portion 130 of cast 120, adjacent inlet 112, as shown in FIG. 7A. The heat flow in the proximal portion, shown by arrows 136, may be larger than the heat flow in distal portion 132, adjacent outlet 116, shown by arrows 134. After a predetermined period of time, a majority of the heat may be removed from proximal portion 130 of cast 120, as shown in FIG. 7B. The heat flow in proximal portion 130, shown by arrows 146, may be smaller than the heat flow in distal portion 132, shown by arrows 144.

Figure 8:
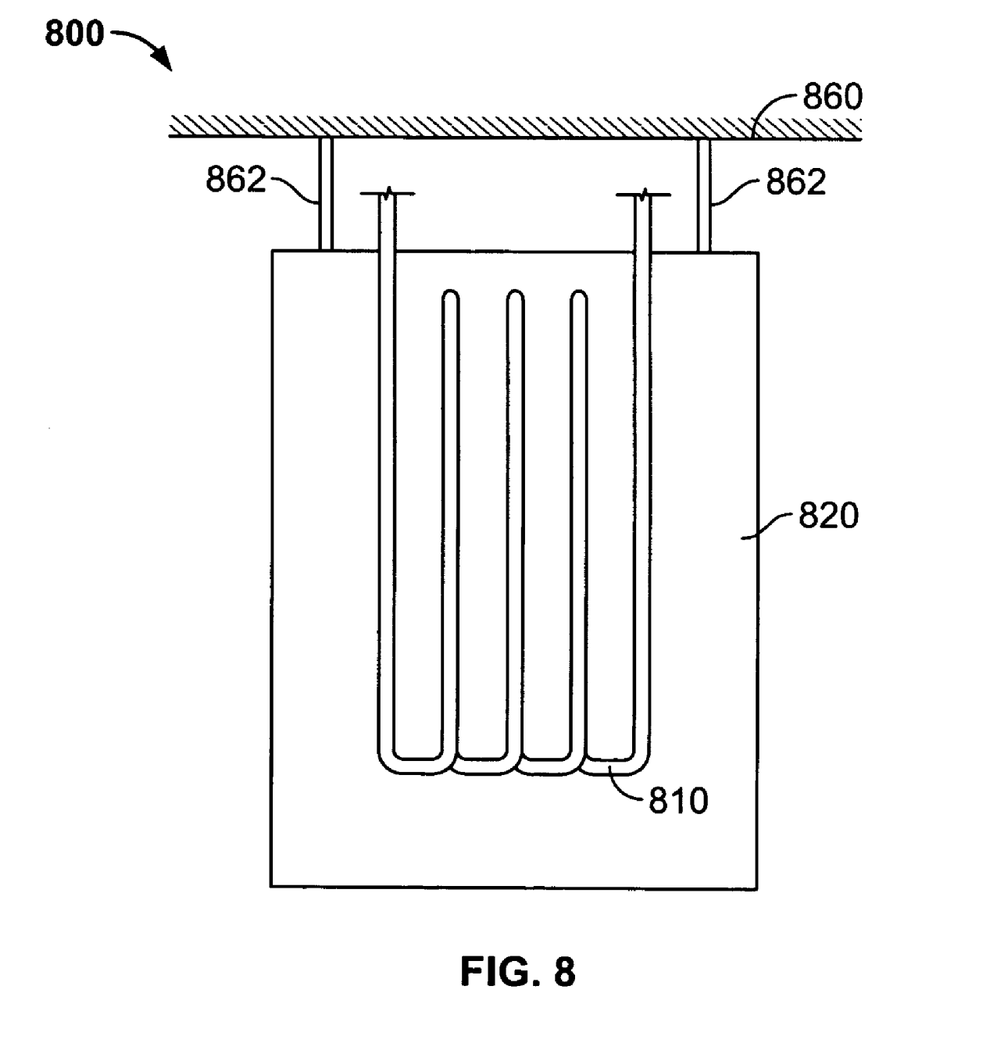
FIG. 8 is a partial sectional view of the thermal storage unit of FIG. 3 in a storage configuration in accordance with the principles of the present invention.

FIG. 8 shows a storage configuration of a TSU in accordance with the principles of the invention. This storage configuration takes into account thermal expansion of the cast and/or conduit that may occur during the operation of TSU 800. One way to avoid potential problems that may arise out of expansion is to design the TSU such that piping connections to other portions of the system are not made on opposite ends of the TSU. FIG. 8 shows such a configuration in which TSU 800 is mounted to support 860 using securing portion 862 such that TSU hangs from support 860. More particularly, the cast of TSU 860 may be mounted to support 860 to permit unrestricted expansion of the conduit, including the inlet and outlet, and the cast. This unrestricted expansion may avoid potential ruptures of the conduit, including the inlet and outlet, as TSU 800 expands, while not impacting the way in which TSU 800 is used.

Figure 9:
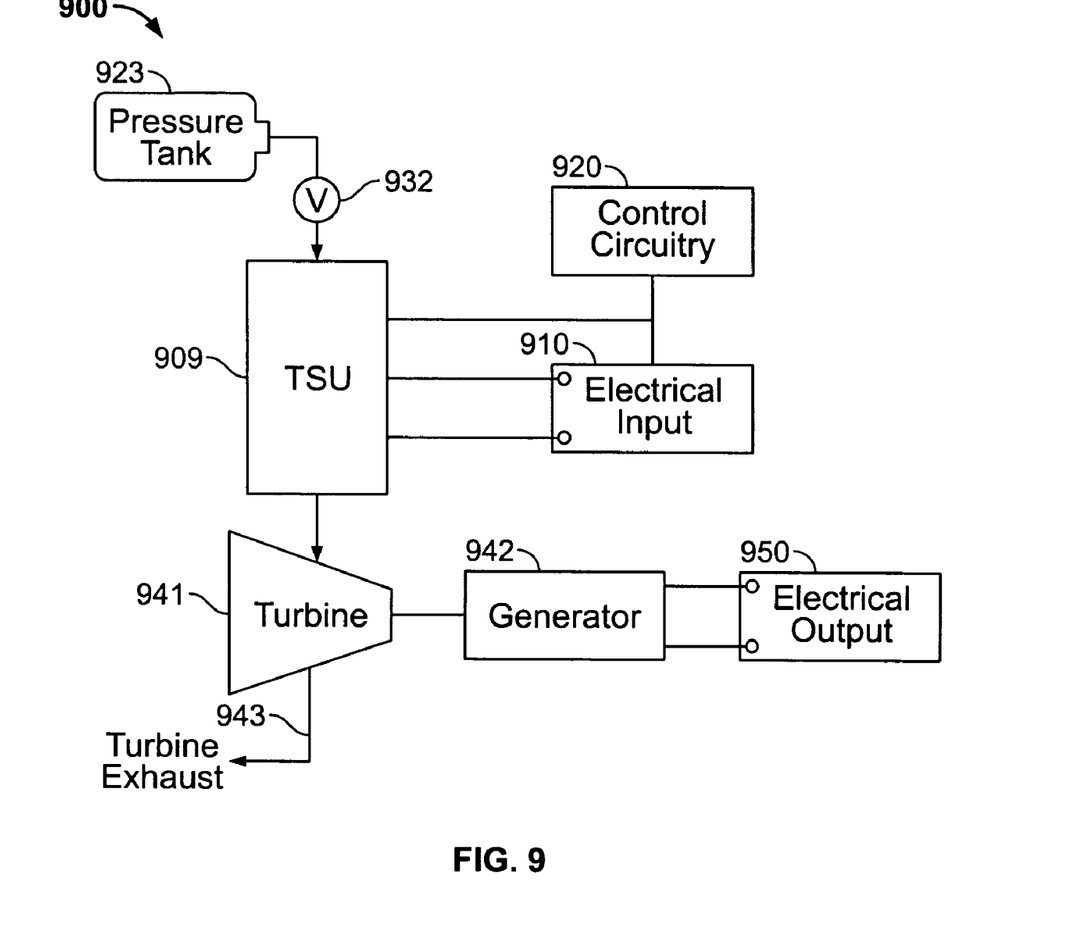
FIG. 9 is a simplified schematic diagram of a thermal and compressed air storage system employing a thermal storage unit in accordance with the principles of the present invention.

The present invention may be used in many applications, one of which is illustrated in FIG. 9. In FIG. 9, a thermal and compressed air storage (TACAS) system 900 for providing output power utilizes a TSU in accordance with the principles of the present invention. TACAS system 900 may represent, for example, a backup energy system that provides backup power to a load in the event of a disturbance in the supply of power from another power source (e.g., utility power failure).

The following discussion of TACAS system 900 is not intended to be a thorough explanation of the components of a TACAS, but rather an illustration of how a TSU according to the present invention can enhance the performance of a TACAS system. For a detailed description of a TACAS system, see commonly-assigned, co-pending U.S. patent application Ser. No. 10/361,728, filed Feb. 5, 2003, which is hereby incorporated by reference herein in its entirety.

As shown in FIG. 9, TACAS system 900 includes storage or pressure tank 923, valve 932, TSU 909, electrical input 910, turbine 941, generator 942 and electrical output 950. When electric power is needed from system 900, compressed gas from pressure tank 923 may be routed through valve 932 to TSU 909. TSU 909 may heat the compressed gas before it is provided to turbine 941. As is known in the art, turbine-generators operate more efficiently when the temperature of the fluid supplied to the turbine inlet ranges between a predetermined range of temperatures. For example, the average desired turbine inlet temperature may be about 450° F.

The hot gas emerging from TSU 909 may flow against the turbine rotor (not shown) of turbine 941, which may be any suitable type of turbine system (e.g., a radial-flow turbine). The heated compressed gas drives the turbine rotor, causing turbine 941 to drive electrical generator 942, which produces electric power and provides it to electrical output 950. Also shown in FIG. 9 is turbine exhaust 943 (e.g., the exhaust gases emerging from turbine 941). Turbine exhaust 943 may be vented through an exhaust pipe (not shown), or simply released to recombine with atmospheric air.

In order for the compressed gas to be heated to a desired inlet temperatures, TSU 909 is heated to a predetermined temperature or range of temperatures. For example, in one embodiment, TSU 909 may be heated to about 1,300° F. TSU 909 may use an exhaustless (e.g., non-polluting) heating system, which is powered by electrical input 910. For example, TSU 909 may include an external or internal heating system, as discussed above. System 900 therefore provides the benefits of heating compressed air from pressure tank 923 before it is supplied to turbine 941, without producing the harmful emissions associated with combustion heating systems.

The heating system may heat and maintain TSU 909 at a predetermined temperature or at a predetermined range of temperatures while system 900 is in a standby mode of operation (e.g., utility power is available). TACAS system 900 may also include control circuitry 920 which may be coupled to both TSU 909 and electrical input 910. Control circuitry 920 may include means for measuring the temperature of TSU 909. Control circuitry 920 may also include electric circuitry for controlling the temperature of TSU 909. Control circuitry 920 may control the temperature of TSU 909 by, for example, controlling the electric power provided to the heating system. This may be achieved by providing instructions to electrical input 910, such as instructions to activate, deactivate, increase or decrease the output of electrical input 910. Control circuitry 920, along with electrical input 910, may therefore be used to monitor and control the temperature of TSU 909.

Initially, during the beginning stages of power delivery, the temperature of the compressed gas exiting TSU 909 may be substantially higher than the desired turbine inlet temperature. Thus, it may be necessary to lower the temperature of the compressed gas before it is supplied to the turbine inlet. One way to control the temperature of the compressed gas being supplied to the turbine inlet is to use a bypass path fluid routing system which selectively controls the mass flow of heated and non-heated air supplied to the inlet of the turbine. The bypass path fluid routing system may include a path (not shown) that routes unheated gas through a path that bypasses TSU 909 and feeds into turbine 941. By controlling the portion of the total compressed gas flowing through the TSU and the bypass path, the ratio of heated to non-heated air provided to turbine 941 may be modified, thereby providing a method for controlling the temperature of the air being supplied to the turbine. As the temperature of the compressed gas provided by TSU 909 drops, the ratio of unheated compressed gas routed through the bypass path may decrease accordingly to maintain a desired turbine inlet temperature. A more detailed explanation of this bypass path architecture may be found, for example, in commonly assigned, co-pending U.S. patent application Ser. No. 10/943,294, filed Sep. 17, 2004, which is incorporated by reference in its entirety.

The above discussion in connection with FIG. 9 was presented in the context of industrial backup utility power. Alternatively, the present invention may be used in any application associated with generating power, such as in thermal and solar electric plants. Furthermore, the present invention may be used in any other application where thermal storage, fluid heating or heated fluid delivery may be desirable.

The above described embodiments of the present invention are presented for purposes of illustration and not of limitation, and the present invention is limited only by the claims which follow.

What is claimed is:

1. A thermal storage unit comprising: a fluid conducting conduit having an inlet, an outlet, and a body;
   a cast that envelops at least the body and that has predetermined external dimensions;
   a support, wherein the cast hangs from the support, and wherein the cast can freely expand; and
   at least one heat source for heating the cast, wherein the at least one heat source comprises induction heating circuitry for causing current to circulate through the cast, whereby the circulating current heats the cast.

2. The thermal storage unit of claim 1 wherein the conduit is stainless steel.

3. The thermal storage unit of claim 1, wherein the conduit is tubing.

4. The thermal storage unit of claim 1, wherein the conduit is piping.

5. The thermal storage unit of claim 1 further comprising: a longitudinal axis, and wherein the conduit is configured such that fluid is routed back and forth substantially parallel to the longitudinal axis a plurality of times before exiting the outlet.

6. The thermal storage unit of claim 1, wherein the conduit comprises a coil shape.

7. A thermal storage unit comprising: a fluid conducting conduit having an inlet, an outlet, and a body;
   a cast that envelops at least the body and that has predetermined external dimensions; and
   a support, wherein the cast hangs from the support, and wherein the cast can freely expand,
   wherein the conduit is a network.

8. The thermal storage unit of claim 7, wherein the cast is bound to the external surface of the conduit.

9. A backup energy system comprising: the thermal storage unit of claim 7 for heating a fluid; a turbine coupled to the thermal storage unit for receiving said heated fluid, the received heated fluid driving the turbine; and an electrical generator for providing power when the turbine is driven by the heated fluid.

10. The backup energy system of claim 9 further comprising a heating system for heating the thermal storage unit.

11. The backup energy system of claim 9 further comprising control circuitry coupled to the heating system and the thermal storage unit, the control circuitry for controlling the heating system to maintain the thermal storage unit at a predetermined temperature.

12. The backup energy system of claim 9, wherein the fluid is compressed air, the backup energy system further comprising a compressed air system to provide the compressed air to the thermal storage unit.

13. The backup energy system of claim 12, wherein the compressed air system is a storage tank that contains the compressed air.

14. The backup energy system of claim 9 further comprising a valve coupled to the thermal storage unit, the valve controls the mass flow of the fluid provided to the thermal storage unit.

15. The thermal storage unit of claim 7, wherein the inlet and the outlet are positioned on the same end of the thermal storage unit.

16. The thermal storage unit of claim 7, wherein the inlet and the outlet are positioned on opposite ends of the thermal storage unit.

17. The thermal storage unit of claim 7 further comprising insulation that is attached to the cast.

18. A method for making a thermal storage unit comprising: providing a fluid conducting conduit network; applying thermal storage material over at least a portion of the conduit to provide a cast that envelops that portion; attaching the cast to a support such that the cast hangs from the support and can freely expand; and modifying the cast such that the thermal storage unit has predetermined external dimensions.

19. The method of claim 18, wherein the applying comprises subjecting the conduit to a casting process.

20. The method of claim 18, wherein the thermal storage material bonds to the exterior surface of the conduit.

21. The method of claim 18, wherein the thermal storage material is uniformly distributed about the conduit.

22. The method of claim 18 further comprising: providing a plurality of tubes of a predetermined size; and applying the thermal storage material to said tubes.

23. The method of claim 22 further comprising inserting heating elements into each one of said plurality of tubes.

24. The method of claim 18 further comprising: drilling a plurality of holes of predetermined size in the cast; and inserting heating elements into each one of said plurality of holes.

* * * * *